(12) United States Patent
Chang et al.

(10) Patent No.: US 8,331,011 B2
(45) Date of Patent: Dec. 11, 2012

(54) DISPLAY DEVICE

(75) Inventors: Jae-Hyuk Chang, Seongnam-si (KR);
Cheol-Woo Park, Suwon-si (KR)

(73) Assignee: Samsung Display Co., Ltd. (KR)

( * ) Notice: Subject to any disclaimer, the term of this patent is extended or adjusted under 35 U.S.C. 154(b) by 689 days.

(21) Appl. No.: 12/574,600

(22) Filed: Oct. 6, 2009

(65) Prior Publication Data

US 2010/0141619 A1    Jun. 10, 2010

(30) Foreign Application Priority Data

Dec. 10, 2008    (KR) ........................ 10-2008-0125450

(51) Int. Cl.
*G02B 26/00*    (2006.01)
(52) U.S. Cl. .................. 359/291; 359/290; 345/206
(58) Field of Classification Search .................. 359/227, 359/230, 290–292, 295; 345/205–206, 211; 310/309
See application file for complete search history.

(56) References Cited

U.S. PATENT DOCUMENTS

| | | | |
|---|---|---|---|
| 5,233,549 A | 8/1993 | Chinn | |
| 5,959,763 A * | 9/1999 | Bozler et al. | .................. 359/290 |
| 5,991,066 A | 11/1999 | Robinson et al. | |
| 6,972,889 B2 | 12/2005 | Goodwin-Johansson et al. | |
| 7,249,856 B2 | 7/2007 | Sinclair | |

FOREIGN PATENT DOCUMENTS

| | | |
|---|---|---|
| KR | 1020070030871 A | 3/2007 |
| KR | 1020070114883 A | 12/2007 |
| KR | 1020080013168 A | 2/2008 |
| KR | 1020080041773 A | 5/2008 |

* cited by examiner

*Primary Examiner* — James Phan
(74) *Attorney, Agent, or Firm* — Innovation Counsel LLP

(57) ABSTRACT

Disclosed is a display device including a substrate having a unit pixel area, a fixed member formed on the substrate to receive a ground voltage, an insulating layer formed on the fixed member, a fixed electrode formed on the insulating layer to receive a common voltage, and a plurality of movable members partially fixed on the insulating layer. The movable members are spaced apart from the fixed electrode at regular intervals, and the plurality of movable members and the fixed electrode are placed within the unit pixel area.

16 Claims, 6 Drawing Sheets

DISPLAY DEVICE

CROSS-REFERENCE TO RELATED APPLICATION

This application claims priority to and the benefit of Korean Patent Application No. 10-2008-0125450 filed in the Korean Intellectual Property Office on Dec. 10, 2008, the entire contents of which are incorporated herein by reference.

BACKGROUND OF THE INVENTION (a) Field of the Invention

The present invention relates to a display device, and more particularly, to a display device performing an image displaying operation by way of electrostatic induction and spatial division luminance control.

(b) Description of the Related Art

Flat panel displays in extensive use include liquid crystal displays, plasma display panels, and organic light emitting displays.

Recently, display devices have been actively developed which have performance characteristics similar to the above-described flat panel displays but with a simplified structure. As one example of such structural development, studies have been made to control the luminance of pixels through opening and closing, by way of electrostatic and elastic forces, movable members associated with individual pixels.

However, if a display device using such electrostatic and elastic forces is used for a long period of time, the switching capacity of the movable members deteriorates so that the luminance of pixels is not controlled correctly.

The above information disclosed in this Background section is only for enhancement of understanding of the background of the invention and may contain information that is not prior art but that is already known in this country to a person of ordinary skill in the art.

SUMMARY OF THE INVENTION

The present invention has been made in an effort to provide a display device having the advantages of enhancing the switching capacity of the movable members while using a simplified structure.

An exemplary embodiment of the present invention provides a display device including a substrate having a unit pixel area, a fixed member formed on the substrate to receive a ground voltage, an insulating layer formed on the fixed member, a fixed electrode formed on the insulating layer to receive a common voltage, and a plurality of movable members partially fixed on the insulating layer. The movable members are spaced apart from the fixed electrode at regular intervals, and the plurality of movable members and the fixed electrode are placed within the unit pixel area.

The application of the ground voltage to the fixed member may occur by connecting the fixed member with a ground electrode, and when the ground voltage is applied to the fixed member, electric charges accumulated at the fixed member may be discharged through the ground electrode.

The fixed member may be connected with the ground electrode via a first thin film transistor, which is driven in accordance with a first signal.

The display device may further include a second thin film transistor for driving the movable members, a gate wire for applying a gate voltage to the second thin film transistor, a data wire for applying a data voltage to the second thin film transistor, and a common wire for applying the common voltage.

The data voltage and the common voltage may be opposite in polarity to each other.

The data voltage may be a positive (+) voltage.

The unit pixel area may have first and second unit pixel area regions, and the gate wire may have first and second gate wire lines corresponding to the first and the second unit pixel area regions, respectively.

The first signal of the second unit pixel area region may be a gate voltage applied to the first gate wire line.

The plurality of movable members may be transformed by way of electrostatic attraction between the movable members and the fixed member.

The plurality of movable members may include first and second movable members, and when the non-fixed portion of the first movable member is spaced apart from the insulating layer by a distance, the second movable member neighboring the first movable member may be electrically isolated from the first movable member.

When the common voltage and the data voltage opposite in polarity to each other are applied to the fixed electrode and the first movable member respectively to form a predetermined voltage difference or more, the first movable member may be transformed to be in a substantially flattened state by way of the electrostatic attraction thereof with respect to the fixed member.

When the first movable member is transformed to be in a substantially flattened state, it may be connected to the second movable member.

When the movable members are not in a substantially flattened state, they may have a sectional shape of a quarter circle or a quarter oval.

The insulating layer may include a color filter.

The movable members may contain an elastic material selected from the group consisting of aluminum, gold, nickel, titanium, an aluminum alloy, and titanium nitride.

The movable members and the fixed electrode may contain a light blocking material.

In an exemplary embodiment of the present invention, a plurality of movable members are enhanced in switching capacity to thereby control the luminance of pixels precisely.

DESCRIPTION OF REFERENCE NUMERALS INDICATING PRIMARY ELEMENTS IN THE DRAWINGS

Figure 1:
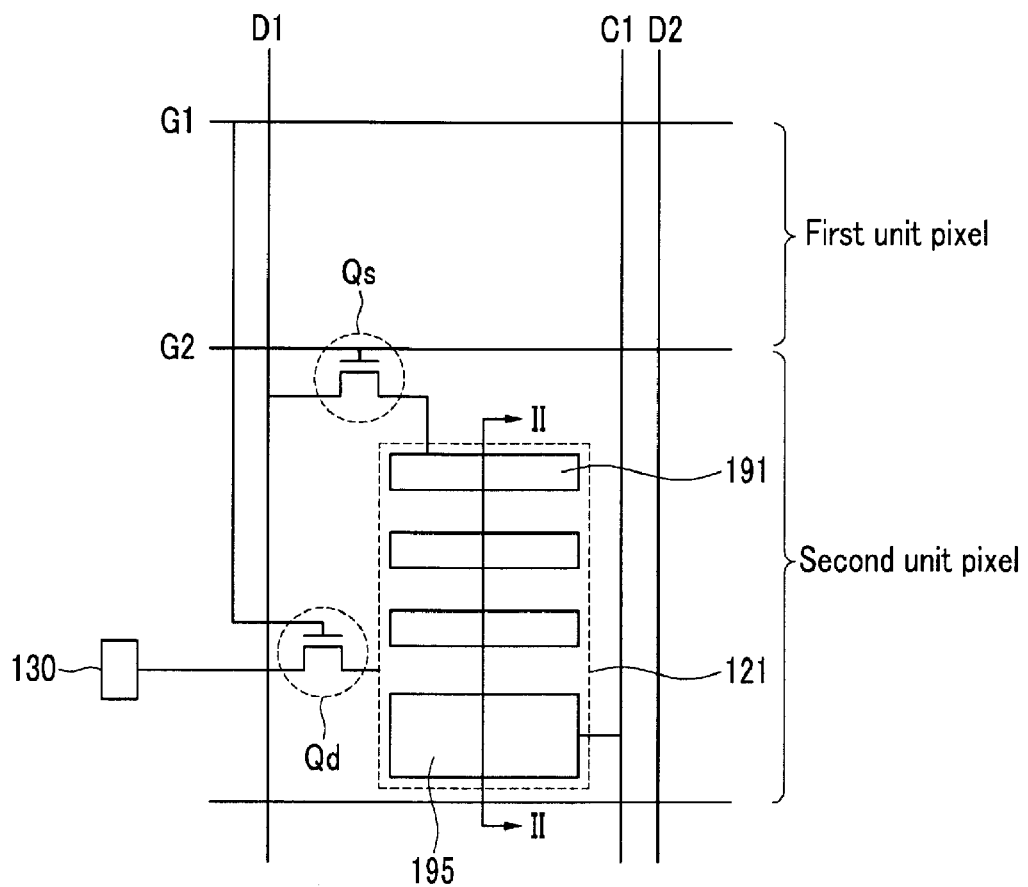
FIG. 1 is a top plan view of a display device according to an exemplary embodiment of the present invention.

| | |
|---|---|
| 110: | substrate |
| 121: | fixed member |
| 180: | insulating layer |
| 191: | movable member |
| 195: | fixed electrode |
| PA: | unit pixel area |
| Qs: | switching thin film transistor |
| Qd: | discharging thin film transistor |
| 130: | ground electrode |

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various ways, without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

A display device according to an exemplary embodiment of the present invention will now be described with reference to FIG. 1 to FIG. 3.

Figure 2:
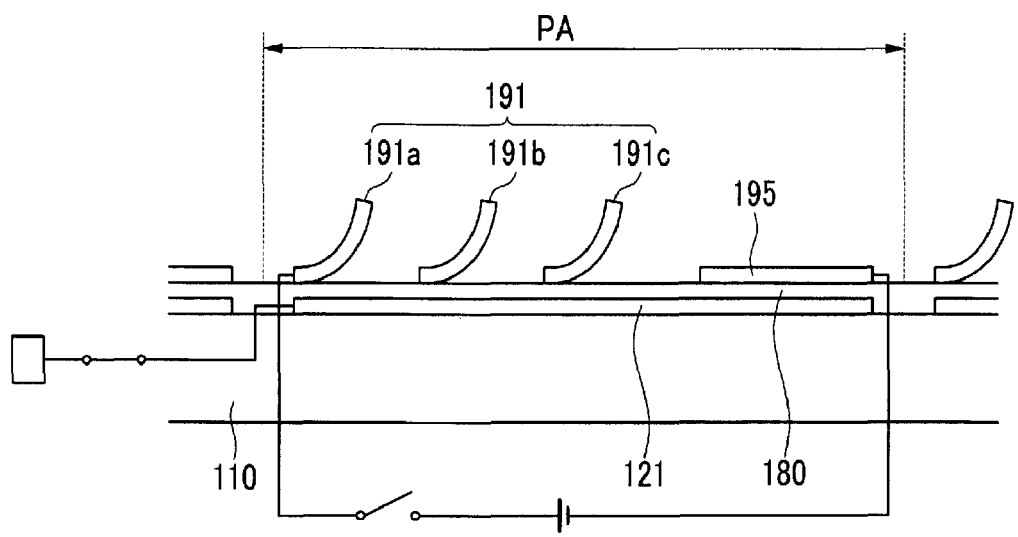
FIG. 2 is a cross-sectional view of the display device of FIG. 1 taken along the II-II line thereof.

FIG. 1 is a plan schematic diagram of a display device according to an exemplary embodiment of the present invention, and FIG. 2 is a cross-sectional schematic diagram of the display device of FIG. 1 taken along the II-II line thereof.

Referring to FIG. 1 and FIG. 2, the display device includes a plurality of gate wires G1 and G2 for transmitting gate voltages, and a plurality of data wires D1 and D2 crossing the gate wires G1 and G2 to transmit data voltages. The gate and data wires form unit pixel areas PA. A common wire C1 is formed parallel to the data wires D1 and D2 to transmit a common voltage.

A plurality of fixed members 121 are formed on a substrate 110 such that each fixed member is individually placed within a unit pixel area PA. Alternatively, the plurality of fixed members 121 may be formed in a body such that each fixed member corresponds to a unit pixel area PA. The fixed member 121 is connected to the ground electrode 130 via a discharging thin film transistor Qd. As the discharging thin film transistor Qd is connected to the previous-row gate wire G1, upon receipt of the previous gate voltage, it discharges electric charges accumulated at the fixed member 121 to a ground electrode 130. The fixed member 121 is formed with a conductive or dielectric material. The fixed member 121 may be formed with a transparent conductive material, such as indium tin oxide (ITO) and indium zinc oxide (IZO), or with an opaque conductive material such as doped silicon, or a conductive polymer and metals.

An insulating layer 180 is formed on the fixed member 121 with an inorganic or organic material. The insulating layer 180 may have a single-layered structure. Alternatively, the insulating layer 180 may have a dual-layered structure with an inorganic layer and an organic layer.

The insulating layer 180 may be a color filter, which is formed with an organic material containing a pigment. In this case, the color filter may express one of the three primary colors of red, green, and blue. The color filter may also be formed on the insulating layer 180 as a distinct layer.

Movable members 191 and fixed electrodes 195 are formed on the insulating layer 180. One fixed electrode 195 and a plurality of movable members 191 are formed at the unit pixel area PA such that they overlap the fixed member 121. The number of movable members 191 may vary depending upon the design features of the display device.

Any one of the plurality of movable members 191 is connected to the switching thin film transistor Qs to receive a predetermined data voltage therefrom. As the switching thin film transistor Qs is connected to the gate and data wires G2 and D1, upon receipt of the gate voltage from the gate wire G2, it transmits the data voltage from the data wire D1 to any one of the movable members 191.

As the fixed electrode 195 is connected to the common wire C1, it receives a common voltage. The voltages applied to the movable member 191 and the fixed electrode 195 are opposite in polarity to each other.

Each movable member 191 is roughly rectangular-shaped, and as shown in FIG. 2, may be curvedly bent or substantially flattened when viewed in cross-section. One end portion of each movable member 191 is fixed to the insulating layer 180, and the remaining part of each movable member 191 is not fixed to the insulating layer 180.

The movable member 191 is bent when no electrostatic forces are applied thereto from the outside, and in this case, it has a rough cross-sectional shape of a quarter circle or quarter oval, such that the portion of the movable member 191 that is not fixed to the insulating layer 180 is spaced apart from insulating layer 180, and a certain area of the insulating layer 180 under the movable member 191 is left exposed. However, when predetermined voltages of opposite polarity are applied to the fixed electrode 195 and the movable member 191, electrostatic induction occurs between the fixed electrode 195 and the fixed member 121 and between the movable member 191 and the fixed member 121 so that attraction is generated between the movable member 191 and the fixed member 121. Then, the movable member 191 substantially flattens such that the portion of the movable member 191 spaced apart from the insulating layer 180 comes close to the insulating layer 180. When the attraction is sufficient, the entire surface of the movable member 191 contacts the insulating layer 180 so as to cover a region of the unit pixel area PA corresponding to the area of the movable member 191 such that the area of the insulating layer 180 under the movable member 191 is no longer exposed. When all of the plurality of movable members 191 are thus in contact with the insulating layer 180, the unit pixel area PA is fully covered and no part of the insulating layer 180 is exposed. When the voltages applied to the fixed electrode 195 and the movable member 191 are removed, the movable member 191 returns to its original bent position.

The fixed electrode 195 is formed with an opaque metal. The movable member 191 is formed with an opaque and elastic metal, such as aluminum, gold, nickel, titanium, an aluminum alloy, or titanium nitride. An insulating coat based on silicon oxide (SiO2) or aluminum oxide (Al2O3) may be formed on the surface of the movable member 191. With reference to FIG. 2, in the case of a transmission type of display device where light originating from the bottom is transmitted to the top, an anti-reflective material layer may be further formed on the insulating coat, while in the case of a reflection type of display device where the light originating from the top is reflected, a reflection-enhancing material layer may be further formed thereon. With the transmission type of display device, the fixed member 121 should be transparent.

A light source (not shown) may be disposed under the substrate 110. The light source may further include a light guide and a reflection member. The light guide guides the light illuminated from the light source, and the reflection member directs the light reflected from the light guide to the unit pixel area so as to reduce the loss of light. With the reflection type of display device, the light source may be omitted.

A light blocking member may be disposed on the substrate 110 to prevent the leakage of light. The light blocking member may be also formed on the other substrate together with the color filter.

Figure 3:
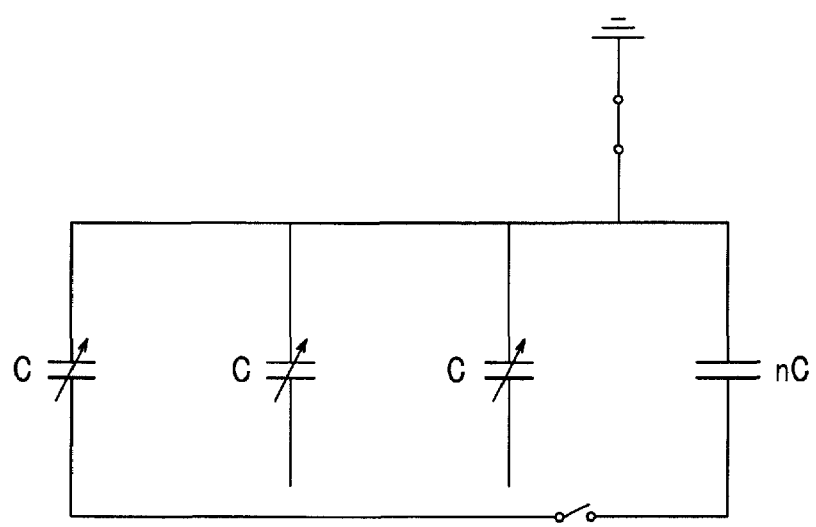
FIG. 3, FIG. 5, FIG. 7, and FIG. 9 are circuit diagrams illustrating the capacitances of the movable members shown in FIG. 1 and FIG. 2 pursuant to operations thereof.

Referring to FIG. 3, with the display device according to the present exemplary embodiment, the respective pixels may be represented by four capacitors and switches.

In the drawing, the capacitors formed by the respective three movable members 191a through 191c and the fixed members 121 and the capacitances thereof each are indicated as C, and the capacitors formed by the fixed electrodes 195 and the fixed members 121 and the capacitances thereof as nC.

A method of driving the display device with the structures shown in FIG. 1 and FIG. 2 will now be described with reference to FIG. 3 to FIG. 10.

Figure 4:
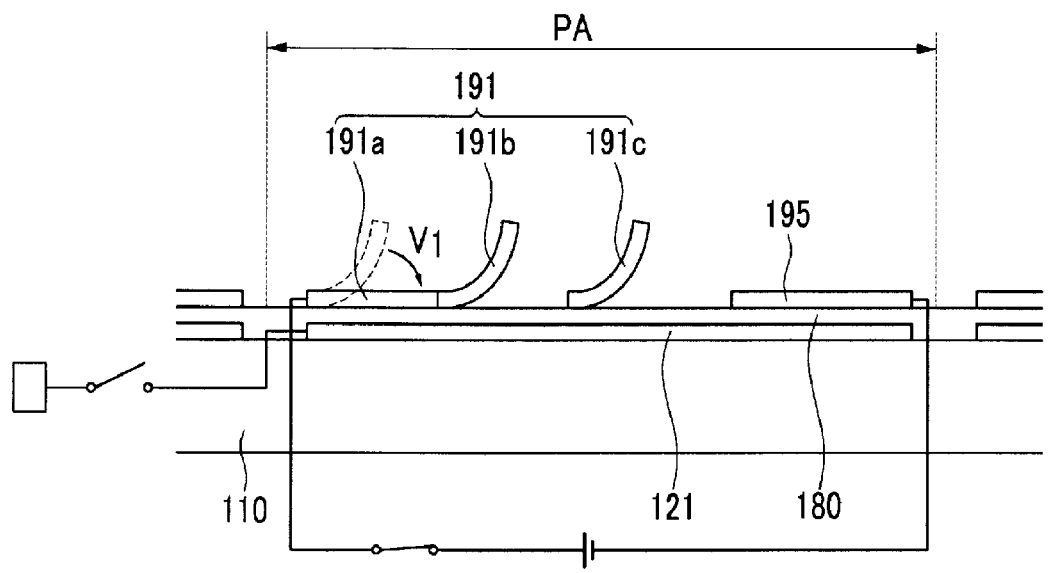
FIG. 4, FIG. 6, and FIG. 8 are cross-sectional views illustrating the operations of the movable members shown in FIG. 1 and FIG. 2.
Figure 5:
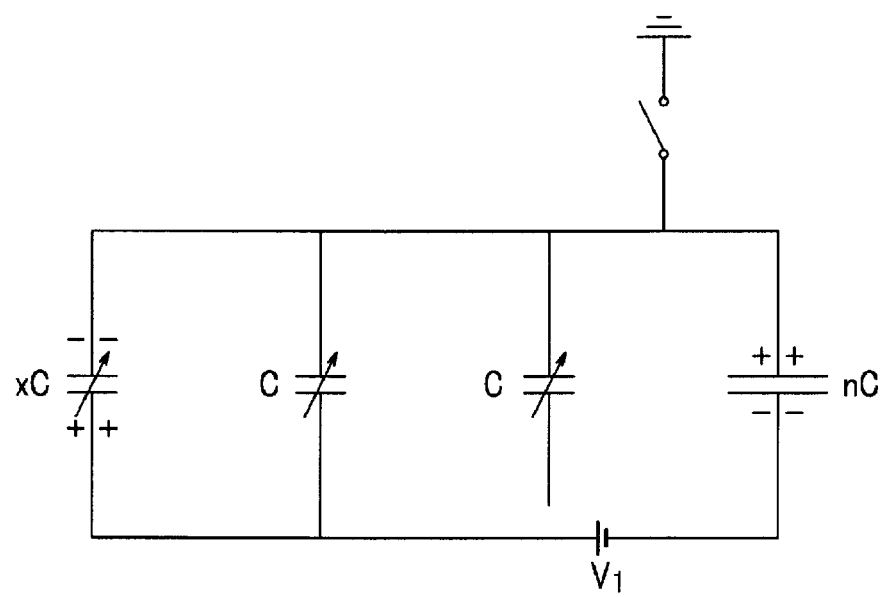
Figure 6:
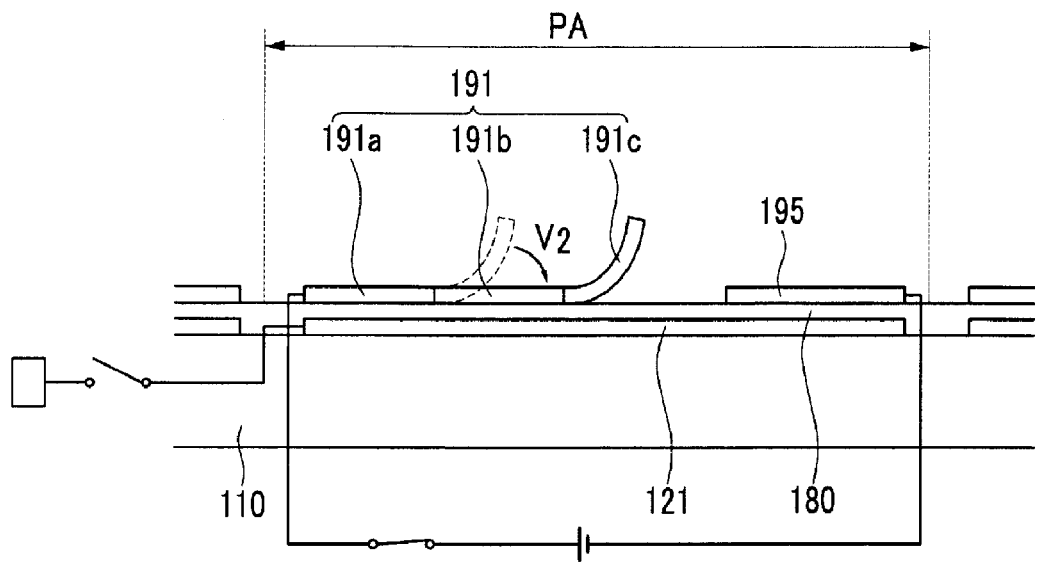
Figure 7:
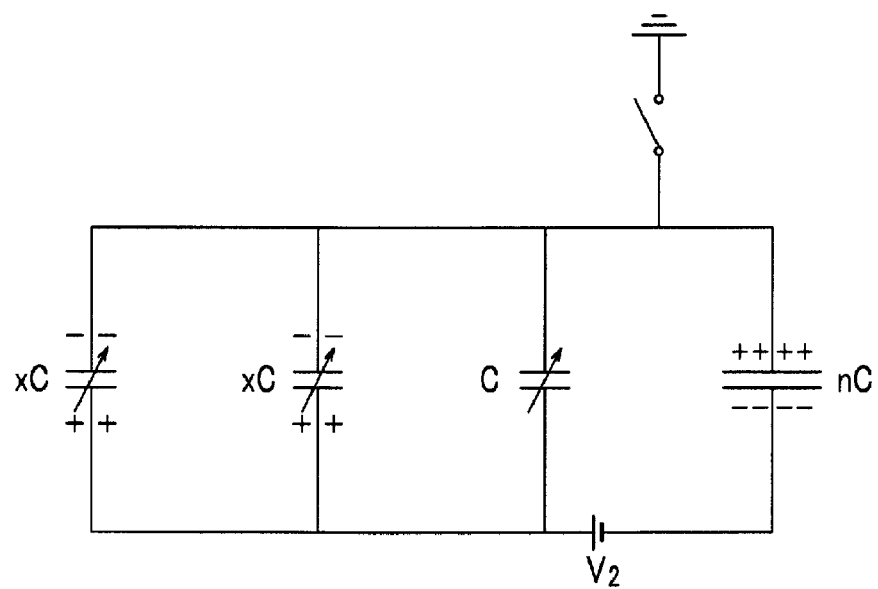
Figure 8:
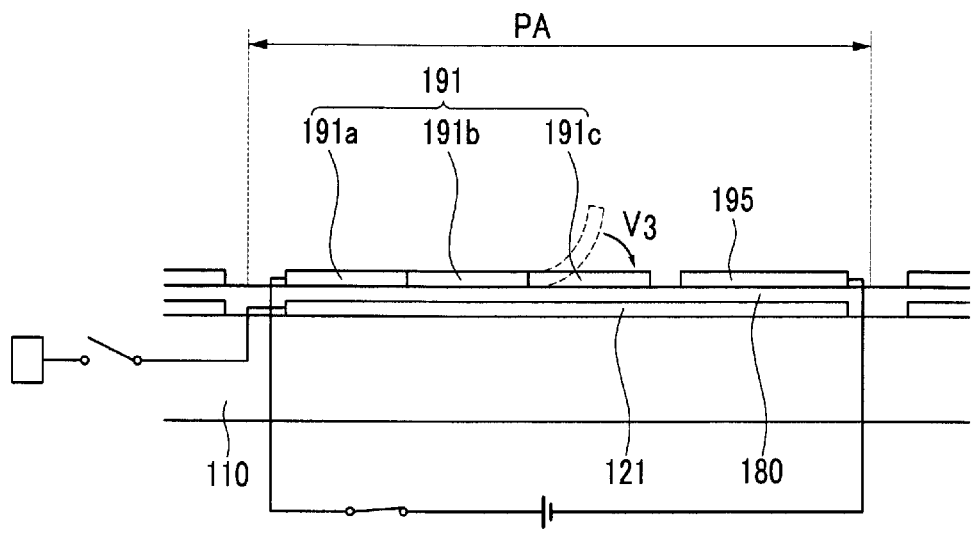
Figure 9:
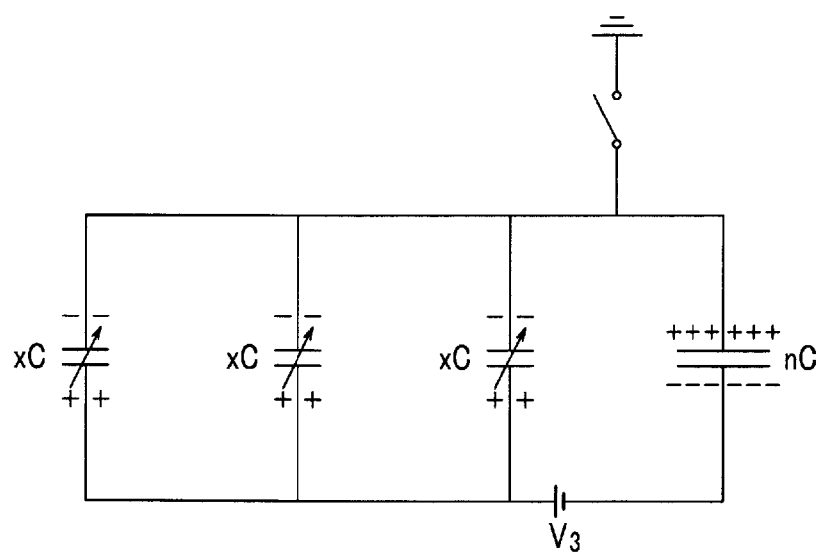
Figure 10:
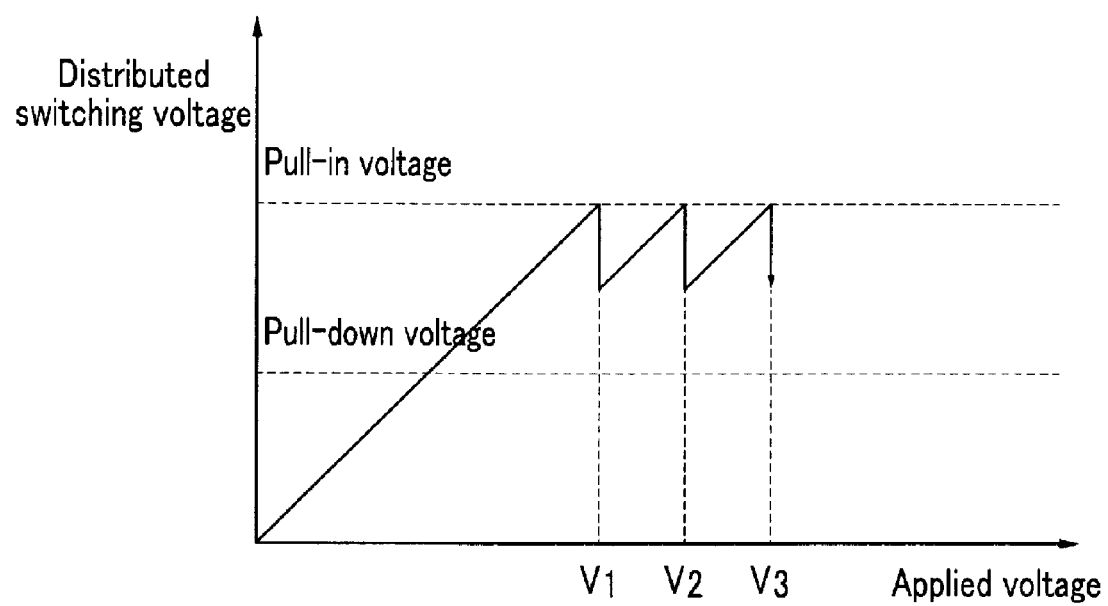
FIG. 10 is a graph illustrating the voltages distributed over the movable members shown in FIG. 1 and FIG. 2.

FIG. 4, FIG. 6, and FIG. 8 are cross-sectional views illustrating the operations of the movable members shown in FIG. 1 and FIG. 2. FIG. 4, FIG. 6, and FIG. 8 are cross-sectional views illustrating a method of expressing luminance by way of spatial division, and the sequential operations of the movable members pursuant to the applied voltages. FIG. 5, FIG. 7, and FIG. 9 are circuit diagrams illustrating the capacitances of the movable members pursuant to the operations thereof, and FIG. 10 is a graph illustrating the voltages distributed over the movable members.

As shown in FIG. 4, the first movable member 191a is transformed to be in a substantially flattened state, and contacts the insulating layer 180. The second and third movable members 191b and 191c are kept in a curved or bent state. That is, as the first movable member 191a covers a first portion of the unit pixel area (PA), light is blocked by the first movable member 191a. By contrast, as the second and third movable members 191b and 191c open second and third portions of the unit pixel area (PA), light passes through the opened portions. As shown in FIG. 2, compared to the case where the first to third movable members 191a, 191b, and 191c open all the portions of the unit pixel area PA, the amount of passage of light is relatively less.

Referring to FIG. 6, as the first and second movable members 191a and 191b cover the first and second portions of the unit pixel area (PA), light is blocked by the first and second movable members 191a and 191b. In contrast, as the third movable member 191c opens the third portion of the unit pixel area (PA), light passes through the opened portion. Compared to the case of FIG. 4, the amount of passage of light is relatively less.

Referring to FIG. 8, the first through third movable members 191a, 191b, and 191c cover all the first through third portions of the unit pixel area (PA), that is, the whole of the unit pixel area (PA), so that light does not pass the unit pixel area (PA), thereby resulting in a black state.

In this way, with the present exemplary embodiment, a plurality of movable members 191a, 191b, and 191c are used to control the degree to which unit pixel area PA is opened to the passage of light, and therefore to precisely control the luminance of the display device.

As shown in FIG. 3 with reference to FIG. 1, before the driving of the unit pixel area (PA), the discharging thin film transistor Qd connected to the previous-row gate wire G1 turns on to connect the fixed member 121 with the ground electrode 130. Then, the electric charges accumulated at the fixed member 121 are discharged to the ground electrode 130. Thereafter, when the gate wire G2 corresponding in sequence to the unit pixel area PA turns on, the discharging thin film transistor Qd turns off so that the fixed member 121 is electrically isolated.

As shown in FIG. 4, FIG. 5, and FIG. 10, voltages opposite in polarity to each other are then applied to the fixed electrode 195 and the first movable member 191a. A negative (−) voltage is applied to the fixed electrode 195, and a positive (+) voltage is applied to the first movable member 191a. Positive (+) electric charges are induced to the one side portion of the fixed member 121 closest to the fixed electrode 195, and negative (−) electric charges are induced to the other side portion of the fixed member 121 closest to the first movable member 191a. If the capacitance (nC) of the fixed electrode 195 and the fixed member 121 is greater than the capacitance xC of the first movable member 191a and the fixed member 121, most of the voltage can be distributed over the first movable member 191a and the fixed member 121. As the fixed electrode 195 is positioned closer to the fixed member 121 than the first movable member 191a and the portion of the first movable member 191a that is spaced apart from the insulating layer 180, and the area of the fixed electrode 195 that overlaps the fixed member 121 is larger than the overlapped area of the first movable member 191a and the fixed member 121, the capacitance nC may be increased. Accordingly, electrostatic attraction is generated between the first movable member 191a and the fixed member 121 by way of electrostatic induction, and the first movable member 191a moves toward the insulating layer 180 due to the attraction. When a predetermined voltage V1 is applied to the first movable member 191a and the fixed electrode 195 so that the voltage distributed over the first movable member 191a and the fixed member 121 reaches a pull-in voltage, the first movable member 191a completely contacts the insulating layer 180, and is simultaneously connected to the second movable member 191b. At the same time, the capacitance xC of the first movable member 191a and the fixed member 121 increases, and the voltage distributed over the first movable member 191a and the fixed member 121 is lowered. Then, the voltage distributed over the first movable member 191a and the fixed member 121 is less than the pull-in voltage so that the first movable member 191a is separated from the second movable member 191b by the curling or bending of the first movable member 191a, and the capacitance xC of the first movable member 191a and the fixed member 121 is reduced. When the capacitance xC of the first movable member 191a and the fixed member 121 is reduced, the voltage distributed over the first movable member 191a and the fixed member 121 again reaches the pull-in voltage, and the first movable member 191a is connected to the second movable member 191b. In this way, with the application of a predetermined voltage V1, the first movable member 191a repeats the connection to and the separation from the second movable member 191b, and is kept in a nearly flattened state. The predetermined voltage V1 becomes a difference between the data voltage applied through the first movable member 191a and the common voltage applied through the fixed electrode 195. Therefore, the first movable member 191a is kept substantially flat, and a small capacitance C is formed between the second movable member 191b and the fixed member 121.

Thereafter, as shown in FIG. 6, FIG. 7, and FIG. 10, when the voltage V1 applied to the first and second movable members 191a and 191b and the fixed electrode 195 further increases, the electrostatic attraction between the second movable member 191b and the fixed member 121 is increased so that the second movable member 191b moves toward the insulating layer 180. When the voltage applied to the first and second movable members 191a and 191b and the fixed electrode 195 reaches a predetermined voltage V2, the voltage distributed over the first and second movable members 191a and 191b and the fixed member 121 again reaches the pull-in voltage. Then, the second movable member 191b completely contacts the insulating layer 180 so that it is connected to the third movable member 191c. At the same time, the capacitance xC of the second movable member 191b and the fixed member 121 increases, and the voltage distributed over the second movable member 191b and the fixed member 121 is lowered. In this case, the voltage distributed over the second movable member 191b and the fixed member 121 is less than the pull-in voltage so that the second movable member 191b is separated from the third movable member 191c by the curling or bending of the second movable member 191b, and the capacitance xC of the second movable member 191b and the fixed member 121 is reduced. When the capacitance xC of the second movable member 191b and the fixed member 121 is reduced, the voltage distributed over the second movable member 191b and the fixed member 121 again reaches the pull-in voltage so that the second movable member 191b is again connected to the third movable member 191c. In this way, with the application of a predetermined voltage V2, the second movable member 191b repeats the connection to and the separation from the third movable member 191c, and is kept in a nearly flattened state. Therefore, the second movable member 191b is kept substantially flat, and a small capacitance C is formed between the third movable member 191c and the fixed member 121.

Then, as shown in FIG. 8, FIG. 9, and FIG. 10, when the voltage V2 applied to the first to third movable members 191a, 191b, and 191c and the fixed electrode 195 further increases, the electrostatic attraction between the third movable member 191c and the fixed member 121 is increased so that the third movable member 191c moves toward the insulating layer 180. When the voltage applied to the first to third movable members 191a, 191b, and 191c and the fixed electrode 195 reaches a predetermined voltage V3, the voltage distributed over the first to third movable members 191a, 191b, and 191c and the fixed member 121 again reaches the pull-in voltage. Then, the third movable member 191c completely contacts the insulating layer 180 while being spaced apart from the fixed electrode 195. At the same time, the capacitance xC of the third movable member 191c and the fixed member 121 increases, and the voltage distributed over the third movable member 191c and the fixed member 121 is lowered. In this case, the voltage distributed over the third movable member 191c and the fixed member 121 is less than the pull-in voltage so that the third movable member 191c separates from the insulating layer 180 by the curling or bending of the third movable member 191c, and the capacitance xC of the third movable member 191c and the fixed member 121 is reduced. When the capacitance xC of the second movable member 191c and the fixed member 121 is reduced, the voltage distributed over the third movable member 191c and the fixed member 121 again reaches the pull-in voltage so that the third movable member 191c is again substantially flattened. In this way, with the application of a predetermined voltage V3, the third movable member 191c repeats the contact with and the separation from the insulating layer 180. Therefore, the third movable member 191c is kept substantially flat.

Accordingly, when the number of movable members 191 that are driven in accordance with the applied voltage is controlled, a plurality of movable members 191 forming a pixel can be driven sequentially by using a wire.

Furthermore, in reverse fashion, when the voltage applied to the first to third movable members 191a, 191b, and 191c decreases to below the pull-down voltage, the first to third movable members 191a, 191b, and 191c may sequentially return to their original positions by the curling or bending of the first to third movable members 191a, 191b, and 191c.

When the display device is driven without discharging the electric charges accumulated at the fixed member 121, the electric charges are accumulated at the fixed member 121 so that the pull-down voltage may be altered, and in a serious case, the movable member 191 may not return to the original position. However, with the present invention, the electric charges accumulated at the fixed member 121 are discharged through the ground electrode 130 in real time, thereby solving this problem.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a substrate having a unit pixel area;
   a fixed member formed on the substrate to receive a ground voltage;
   an insulating layer formed on the fixed member;
   a fixed electrode formed on the insulating layer to receive a common voltage; and
   a plurality of movable members partially fixed on the insulating layer, the movable members being spaced apart from the fixed electrode by a distance,
   wherein the plurality of movable members and the fixed electrode are placed within the unit pixel area.

2. The display device of claim 1, wherein the application of the ground voltage to the fixed member is performed by connecting the fixed member with a ground electrode, such that when the ground voltage is applied to the fixed member, the electric charges accumulated at the fixed member are discharged through the ground electrode.

3. The display device of claim 2, wherein the fixed member is connected with the ground electrode via a first thin film transistor, and the first thin film transistor is driven in accordance with a first signal.

4. The display device of claim 3 further comprising:
   a second thin film transistor for driving the movable members;
   a gate wire for applying a gate voltage to the second thin film transistor;
   a data wire for applying a data voltage to the second thin film transistor; and
   a common wire for applying the common voltage.

5. The display device of claim 4, wherein the data voltage and the common voltage have opposite polarities.

6. The display device of claim 5, wherein the data voltage is a positive (+) voltage.

7. The display device of claim 4, wherein the unit pixel area has first and second unit pixel area regions, and the gate wire has first and second gate wire lines corresponding to the first and second unit pixel area regions, respectively.

8. The display device of claim 7, wherein the first signal of the second unit pixel area region is a gate voltage applied to the first gate wire line.

9. The display device of claim 1, wherein the plurality of movable members are moved by way of electrostatic attraction between the movable members and the fixed member.

10. The display device of claim 9, wherein the plurality of movable members comprises first and second movable members, such that when a non-fixed portion of the first movable member is spaced apart from the insulating layer by a distance, the second movable member neighboring the first movable member is electrically isolated.

11. The display device of claim 10, wherein when the common voltage and the data voltage opposite in polarity to each other are applied to the fixed electrode and the first movable member, respectively, to thereby form a predetermined voltage difference or more, the first movable member is transformed to be in a substantially flattened state by way of the electrostatic attraction thereof to the fixed member.

12. The display device of claim 11, wherein when the first movable member is transformed to be in a substantially flattened state, the first movable member is connected to the second movable member.

13. The display device of claim 12, wherein when the plurality of movable members are not in a substantially flattened state, each of the plurality of movable members has a cross-sectional shape of a quarter circle or a quarter oval.

14. The display device of claim 1, wherein the insulating layer comprises a color filter.

15. The display device of claim 14, wherein the plurality of movable members contain an elastic material selected from the group consisting of aluminum, gold, nickel, titanium, an aluminum alloy, and titanium nitride.

16. The display device of claim 15, wherein the movable member and the fixed electrode contain a light blocking material.

* * * * *